United States Patent
Luo et al.

(10) Patent No.: US 9,503,374 B2
(45) Date of Patent: Nov. 22, 2016

(54) APPARATUS FOR HYBRID ROUTING IN SDN NETWORKS TO AVOID CONGESTION AND ACHIEVE GOOD LOAD BALANCING UNDER FLUCTUATING TRAFFIC LOAD

(71) Applicant: Futurewei Technologies Inc., Plano, TX (US)

(72) Inventors: Min Luo, San Jose, CA (US); H. Jonathan Chao, Holmdel, NJ (US); Wu Chou, Basking Ridge, NJ (US); Junjie Zhang, Brooklyn, NY (US); Kang Xi, Morganville, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 97 days.

(21) Appl. No.: 14/161,496

(22) Filed: Jan. 22, 2014

(65) Prior Publication Data

US 2015/0207741 A1   Jul. 23, 2015

(51) Int. Cl.
*H04L 12/26* (2006.01)
*H04L 12/743* (2013.01)
*H04L 12/781* (2013.01)

(52) U.S. Cl.
CPC .......... *H04L 45/7457* (2013.01); *H04L 45/52* (2013.01)

(58) Field of Classification Search
None
See application file for complete search history.

(56) References Cited

U.S. PATENT DOCUMENTS

| | | | |
|---|---|---|---|
| 2007/0076601 A1* | 4/2007 | Wang et al. | 370/229 |
| 2013/0286846 A1* | 10/2013 | Atlas et al. | 370/236 |
| 2015/0156106 A1* | 6/2015 | Allan | 370/229 |

* cited by examiner

*Primary Examiner* — Kwang B Yao
*Assistant Examiner* — Juvena Loo
(74) *Attorney, Agent, or Firm* — Futurewei Technologies, Inc.

(57) ABSTRACT

A controller having an application optimally routing traffic to balance fluctuating traffic loads in a SDN network. A processor is configured to control the data plane to establish routing through the plurality of routers, wherein the processor is configured to establish hybrid routing comprising both explicit routing and destination-based routing. The processor utilizes a set of traffic matrices representing the fluctuating traffic load over time. A destination-based multi-path routing algorithm is configured to improve load balancing of the traffic load based on the set of representative traffic matrices. The destination based routing is calculated based on linear programming. The processor comprises a traffic categorization algorithm configured to identify a set of key flows, wherein the processor is configured to explicitly route the set of key flows. The processor is configured such that the set of key flows consume a small fraction of a ternary content-addressable memory (TCAM), and such that the set of key flows provide a routing decision for a large portion of the traffic load.

20 Claims, 6 Drawing Sheets

APPARATUS FOR HYBRID ROUTING IN SDN NETWORKS TO AVOID CONGESTION AND ACHIEVE GOOD LOAD BALANCING UNDER FLUCTUATING TRAFFIC LOAD

TECHNICAL FIELD

The present application relates generally to a software-defined networking (SDN) network, and more specifically, to load balancing a fluctuating traffic load in a SDN network.

BACKGROUND

Balancing the traffic load in a SDN network is critical to avoid congestion, achieve high bandwidth utilization, and ensure quality of service (QoS). There remains a great challenge when the traffic load is fluctuating, especially when such fluctuation is quite intense in terms of scale and volume. Currently, there is still no good solution for this problem.

SDN decouples data forwarding capability from routing, resource and other management needs, while such functionality, distributed in IP networks, are now logically centralized into a SDN-OpenFlow(OF)controller.

With the global network topology and states, and the dynamic flow of information, the SDN controller(s) can make better optimized decisions on how to assign network resources and route different traffic flows.

With SDN, it is possible to devise a good load-balancing apparatus as an application over the SDN controller, while such an application is executed to (sub-) optimally route traffic that balances the loads, configure the network in either static or dynamic way under various traffic load scenarios.

There are current related approaches each having limitations:

OSPF (open shortest path first)-ECMP (equal-cost multi-path): Widely adopted, however, it computes shortest paths without considering traffic scenarios. Therefore, it cannot achieve good load balancing and high resource utilization. The probability of congestion is high (poor quality of solution).

Traffic-aware destination-based routing: Optimized for a given traffic load. It performs better than OSPF-ECMP. However, the performance is not good enough, especially when dealing with fluctuating traffic load. The main reason is that destination-based routing lacks flexibility in terms of routing.

Complete explicit routing: It supports flexible routing for each individual flow (a flow can be flexibly defined, e.g. src/dst IP, 5-tuple header fields). It is enabled by SDN and multi-protocol label switching (MPLS). It can achieve the optimal performance. However, the complexity is high. In a large network with a huge number of flows, routers may not have enough capacity in the flow tables (e.g., limited ternary content-addressable memory (TCAM)). So this approach is not scalable.

Key issues that have yet to be fully addressed include:
How to achieve good load balancing under a fluctuating traffic load;
How to ensure applicability of the approach in large-scale centrally controlled networks, e.g., SDN;
How to ensure that the approach has low computation and resource complexity; and
How to ensure that the approach works well when routers/switches have limited TCAM resources.

SUMMARY

This disclosure includes a load-balancing apparatus and method configured as an application executable over an SDN controller.

In a preferred embodiment of the disclosure, a controller has an executable application optimally routing traffic to balance the fluctuating traffic load. A processor is configured to control the data plane to establish routing through the plurality of routers, wherein the processor is configured to establish hybrid routing comprising both explicit routing and destination-based routing to balance the traffic load in the network during the fluctuating load. The processor is configured to utilize a set of traffic matrices representing the fluctuating traffic load over time. The set of representative traffic matrices are based on historical traffic measurement data. The processor includes a destination-based multi-path routing algorithm configured to improve load balancing of the traffic load based on the set of representative traffic matrices. The destination based routing is calculated based on linear programming. The processor comprises a traffic categorization algorithm configured to identify a set of key flows, wherein the processor is configured to explicitly route the set of key flows. The processor is configured such that the set of key flows consume a small fraction of a ternary content-addressable memory (TCAM), and such that the set of key flows provide a routing decision for a large portion of the traffic load. The processor is configured to combine the destination-based routing and the explicit routing in a complementary way to realize the hybrid routing, and is configured to be used in static network planning and dynamic routing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged network having varying traffic loads.

The present disclosure includes a controller with a hybrid load balancing algorithm configured to control a data plane that achieves good load balancing, high resource utilization, and low congestion probability under fluctuating traffic loads, such as for use in SDN networks. It provides high quality by minimizing the possibility of congestion and achieves near-optimal load balancing. It is highly scalable by ensuring low computation complexity and low TCAM requirement. It has robustness and achieves consistent good performance under a variety of traffic scenarios and different network topologies. It has applicability and can be easily implemented in centrally controlled networks, such as SDN networks.

Advantageously, the present disclosure includes an apparatus, such as a controller, including hybrid routing in a centrally controlled network, such as, but not limited to, a SDN network, and a method of operation. The controller includes an algorithm configured as a controller application that uses of a set of representative traffic matrices that model fluctuating traffic loads. The destination-based multipath routing algorithm improves load balancing based on multiple traffic matrices. A traffic categorization mechanism identifies a small set of key flows. The algorithm explicitly routes the previously identified set of key flows that consumes a small fraction of TCAM, but provides routing decision for a significantly large portion of the loads. The algorithm combines destination-based routing and explicit routing in a complementary way to advantageously realize hybrid routing.

Figure 1:
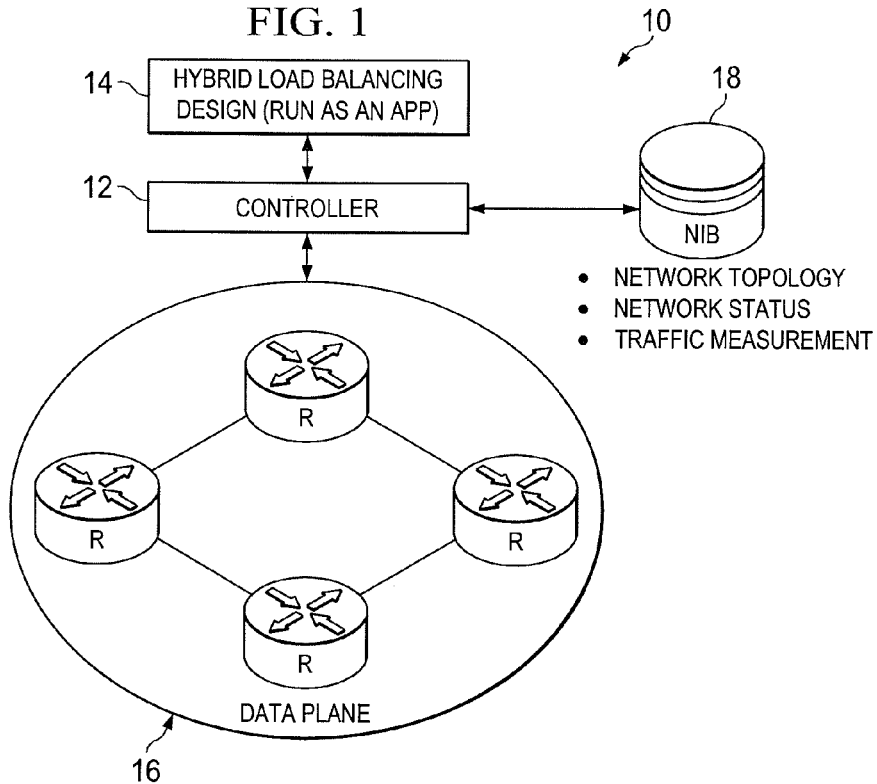
FIG. 1 illustrates a SDN network including a SDN controller(s) configured to execute a hybrid load balancing algorithm according to an exemplary embodiment of the disclosure.

FIG. 1 illustrates a top level view of a SDN network at 10 seen to include a SDN controller(s) 12 configured to execute a hybrid load balancing algorithm 14 configured as an application according to this disclosure. The controller 12 comprises the control plane, which controls the data plane comprising a plurality of routers R generally shown at 16, and interfaces with NIB 18.

Figure 2:
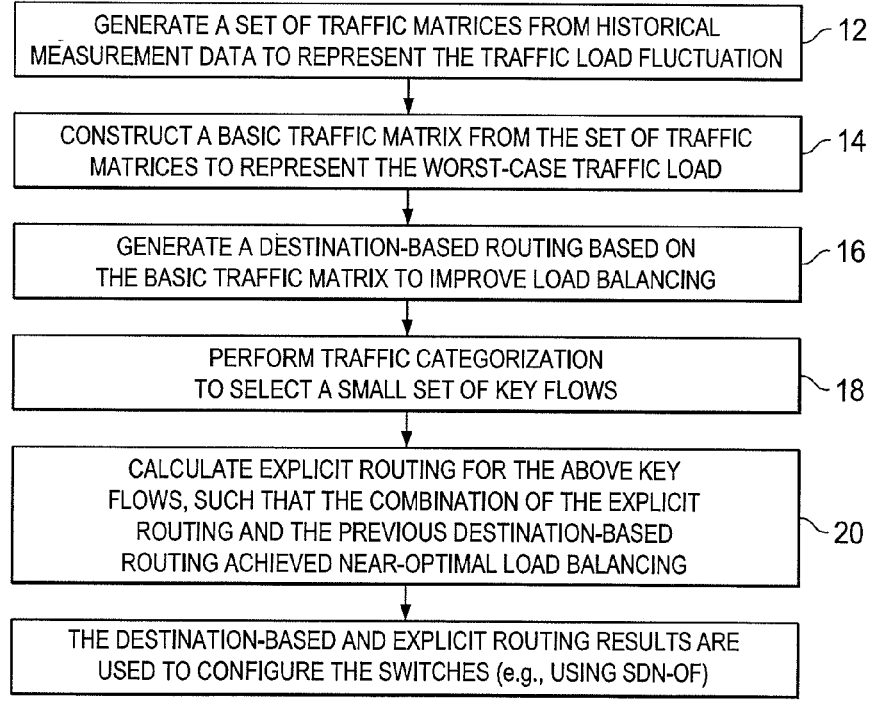
FIG. 2 illustrates an overview of the framework for the hybrid load balancing algorithm and mechanisms according to an exemplary embodiment of the disclosure.

An overview of the framework for the hybrid load balancing algorithm and mechanisms according to the present disclosure is shown at 20 in FIG. 2.

At step 22, traffic modeling is generated. In a N-node network, a traffic matrix T is N×N, where element t(i,j) represents the traffic volume from node i to node j. A set of traffic matrices are generated that represent fluctuating traffic load over time and that are based on the historical traffic measurement data.

A traffic modeling method periodically checks the load of each network link, and when the load of any link exceeds a predetermined threshold, e.g., 80%, the traffic matrix is added at that moment to the set. The rationale is that the current routing is not good enough to balance the load under this traffic matrix.

Figure 3:
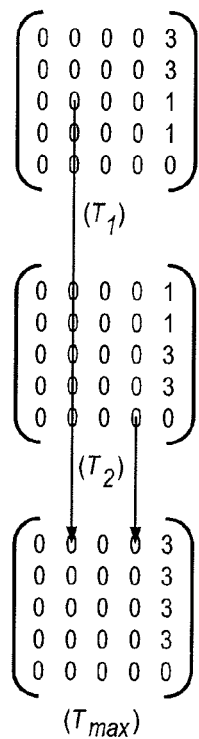
FIG. 3 illustrates an initial traffic matrix set obtained according to an exemplary embodiment of the disclosure.

After an initial traffic matrix set is obtained as shown in FIG. 3, redundancy is removed by comparing any pair of matrices. For example, for matrices T1 and T2, X=T1−T2. If sum(x(i,j))>=0 and min(x(i,j))>delta (e.g., delta=−10 Mb/s), then T2 is removed from the set.

At step 24, given a set of traffic matrices, a basic traffic matrix is constructed, where each element is determined as follows:

$$h_{max}^{s,d} = \max_{t=1,2,\ldots,L} \left(h_t^{s,d}\right)$$

The meaning is for each node pair (s,d), the maximum demand volume is picked from the set of traffic matrices and is used in the basic traffic matrix. The rationale is that the basic traffic matrix represents the worst-case traffic load. The worst case can be adjusted by some penalty factors for some selected link set {(i,j)} based on historical observation or empirical measures, or network management expectations.

At step 26, the Destination-Based Routing is computed based on the basic traffic matrix (worst-case or adjusted load), wherein linear programming is used to find the optimal destination-based multipath routing. The linear programming is formulated as:

Objective: minimize the maximum link load while ensuring "loop-free"

Constraints:

Constraint for link load generated by destination-based multipath routing

Flow Conservation Constraint

Any good Linear Programming (LP) package (such as CPLEX) can be used to get the optimal solution. It is also possible to develop a heuristic algorithm based on the above formulation (e.g., using simulated annealing).

The result is better than OSPF-ECMP. However, it is based on the worst-case loads, thus there exists over-provisioning problem. Therefore, there is still room for further improvement.

At step 28, a small set of key flows are identified to apply explicit routing. Here, a flow is defined as all the packets from an ingress router to an egress router. (In backbone networks, such a flow typically consists of a large number of TCP/UDP flows). The set size to K is predetermined (e.g., K=20).

The following is performed recursively until K flows are identified:

For each flow (s,d), initially set its traffic to zero;

Apply the destination-based routing to each traffic matrix (from all the scenarios), record the maximum link utilization r under all the traffic matrix; and The flow that produces the minimum r is added to the set as a key flow, and its traffic is set to zero for subsequent iterations.

At step 30, explicit routing for the key flows is calculated, such that the combination of the explicit routing and the previous destination-based routing achieves near-optimal load balancing.

At step 32, the destination based and explicit routing results are used to configure the switches) e.g., using SDN-OF).

Hybrid Routing=Explicit Routing+Destination-Based Routing

For ER (explicit routing), the small number of key flows are processed using explicit routing.

For DR (destination-based routing), the rest of the key flows are processed using the previously calculated destination-based routing.

This disclosure provides the optimal explicit routing such that the above combination of ER and DR achieves the optimal load balancing.

Optimal Explicit Routing Computation

The solution can also be formulated as a linear program:

Objective Function: minimize the maximum link load while ensuring "loop-free";

Constraints: Constraint for link load generated by destination-based multipath routing and explicit routing; Flow conservation constraint.

The solution gives a combination of explicit routing and destination-based routing that achieves near-optimal load balancing. A good LP solver or heuristic algorithms provides the near-optimal solution for such a problem.

Example of Hybrid Routing Implementation

Figure 4:
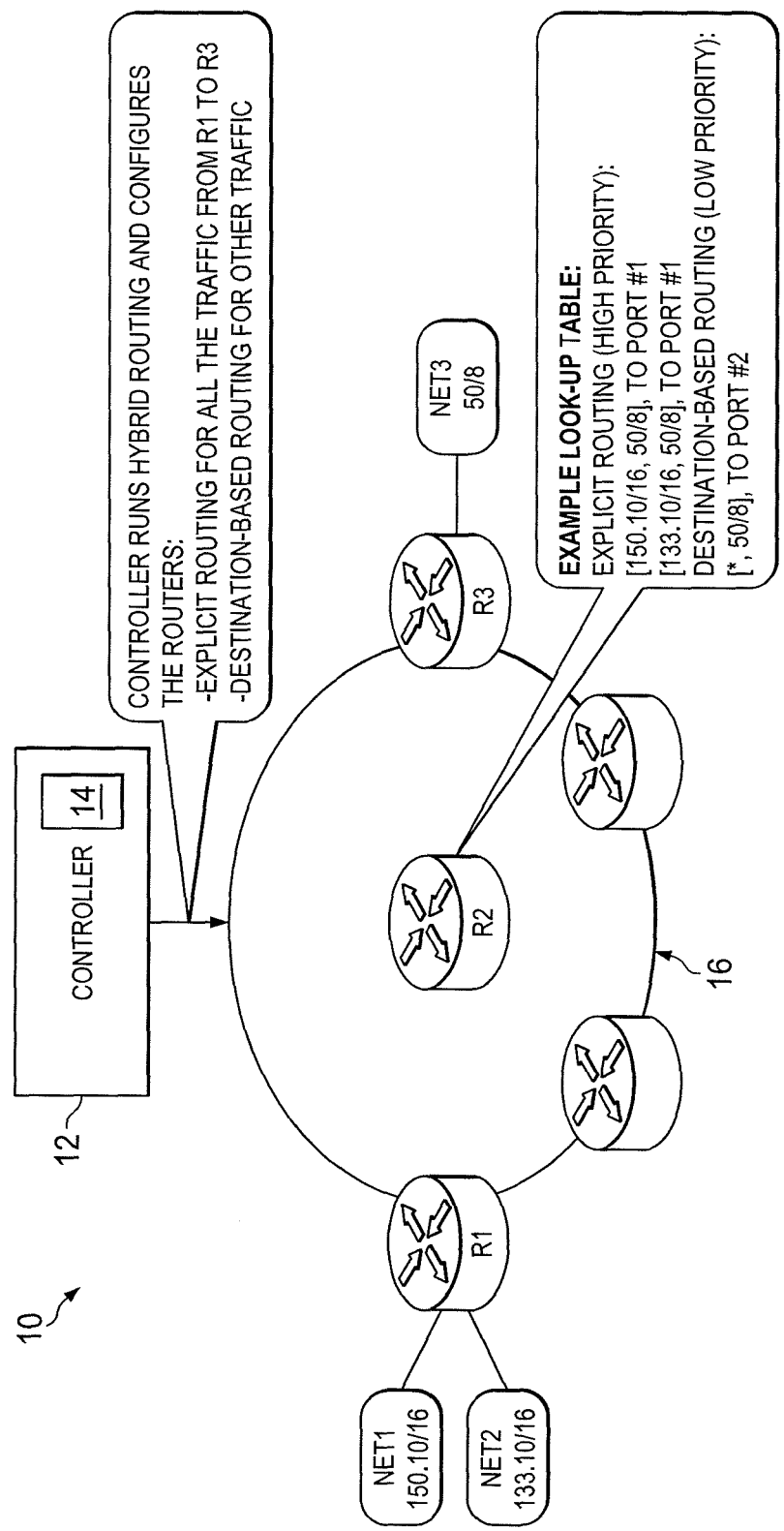
FIG. 4 illustrates a preferred embodiment of the disclosure including the controller running the hybrid routing algorithm to determine explicit routing for traffic from routers R1☐R3, and destination-based routing for all the other traffic in the data according to an exemplary embodiment of the disclosure.

Referring to FIG. 4, there is shown a preferred embodiment of the disclosure at 10 including the controller 12 and a plurality of routers R. The controller 12 runs the hybrid routing algorithm 14 according to this disclosure and determines to use explicit routing for traffic from routers R1☐R3, and destination-based routing for all the other traffic in the data plane 16. The decision is translated to look-up table entries for each router R. Such entries can be downloaded to the routers R either in advance or up the arrival of a new flow, depending on the operation. In case of multiple matches, explicit routing has higher priority than destination-based routing.

Possible Implementation of Forwarding Entries

Figure 5:
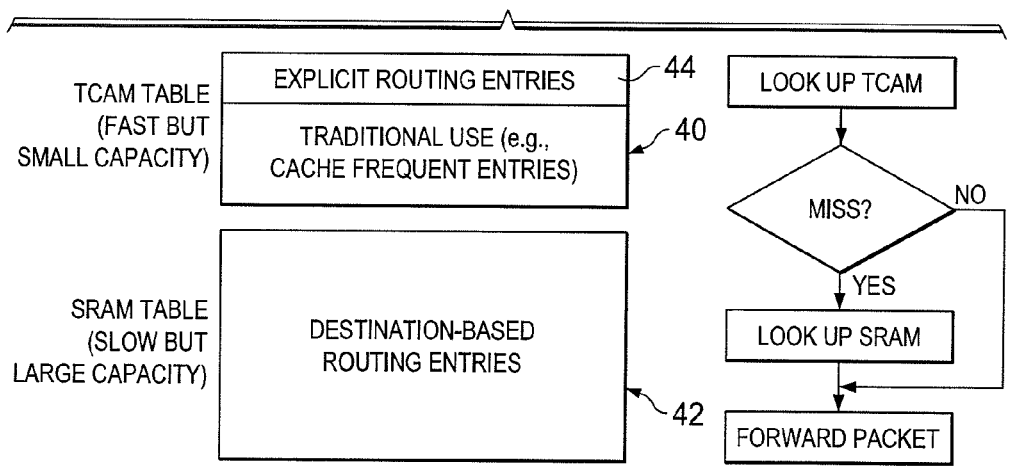
FIG. 5 illustrates each router R having a small TCAM table and a large SRAM table, where the small portion of the TCAM table is allocated to store explicit routing entries that can process "key flows", while the remainder of the TCAM table is used as in traditional mode. The SRAM table is used to store the destination-based routing.

Referring to FIG. 5, typically, each router R has a small TCAM table 40 and a large SRAM table 42. A small portion 44 of the TCAM table 40 is allocated to store explicit routing entries that can process "key flows", while the remainder of the TCAM table 40 is used as in traditional mode. The SRAM Table 42 is used to store the destination-based routing entries.

Traffic Splitting in Implementation

Figure 6:
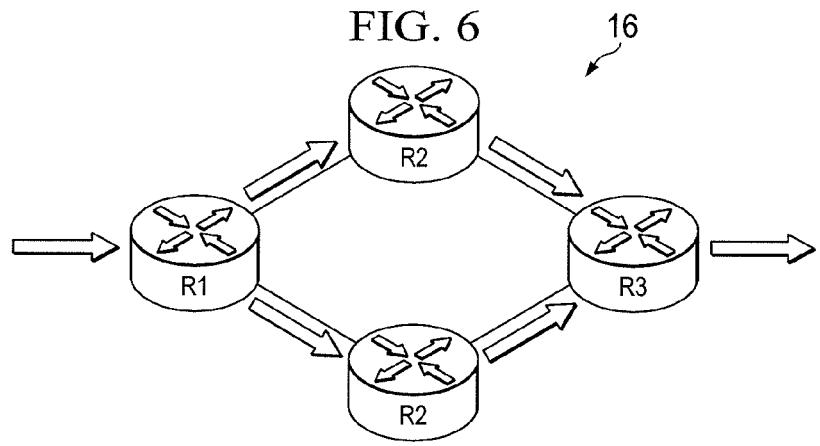
FIG. 6 illustrates hybrid routing using multiple paths in both destination-based routing and explicit routing.

Referring to FIG. 6, hybrid routing may use multiple paths in both destination-based routing and explicit routing. A router R may need to split the incoming traffic to multiple output ports, based on the pre-computed split ratios. A TCP (or UDP) flow preferably follows a single path.

An approximate to the above traffic splitting is to hash the 5-tuple packet header and then allocate flow to one of the output port based on the hash results and the ratios. (refer RFC2992).

In backbone networks, each link (e.g. 10G) carries a large number of TCP/UDP flows and each individual flow is relatively small compared to the link capacity, thus the above method performs closely to the theoretical results of hybrid routing.

Performance Evaluation

The performance metric is normalized throughput, defined as throughput using a certain approach/optimal throughput using complete explicit routing.

The throughput is defined as the inversion of the maximum link utilization.

Four real ISP networks are used for evaluation as shown in Table I below:

Destination-Based Routing

The destination-based routing brings significant improvement over OSPF-ECMP, as shown in Table II below. It even achieves near-optimal throughput in Sprintlink. However, there is still room for further optimization for the other networks, especially EBONE.

TABLE II

COMPARISON OF NORMALIZED THROUGHPUT

| Topology | OSPF-ECMP | Destination-based Routing |
| --- | --- | --- |
| Exodus 3967 | 0.618 | 0.863 |
| Abovenet 6461 | 0.508 | 0.816 |
| EBONE 1755 | 0.546 | 0.748 |
| Sprintlink 1239 | 0.569 | 0.985 |

Throughput of Hybrid Routing

Figure 7:
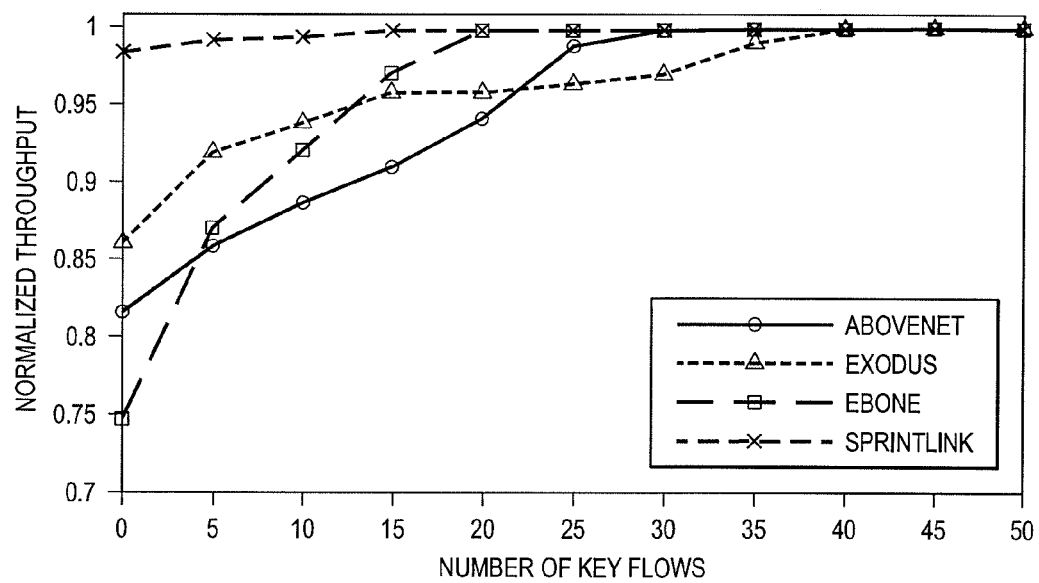
FIG. 7 illustrates near optimal load balancing is achieved with only a small number of key flows.

When the number of key flows is increased, a dramatic performance improvement is observed, as shown in FIG. 7. Near optimal load balancing is achieved with only a small number of key flows.

Abovenet, Exodus, and EBONE each have over 400 node pairs, selecting 5-10% of the pairs (20-40 key flows) achieves near-optimal performance.

Savings on TCAM

Almost the same performance as optimal explicit routing is achieved, but requires just a small fraction of the TCAM resources as shown below.

| Topology | # of entries for optimal explicit routing | # of entries for hybrid routing (explicit routing) | # of entries for hybrid routing (basic destination-based routing) |
| --- | --- | --- | --- |
| Exodus 3967 | 1471 | 87 | 462 |
| Abovenet 6461 | 1137 | 77 | 462 |
| EBONE 1755 | 1485 | 91 | 506 |
| Sprintlink 1239 | 6287 | 91 | 1892 |

Consistent Good Performance Under Traffic Fluctuation

Figure 8A:
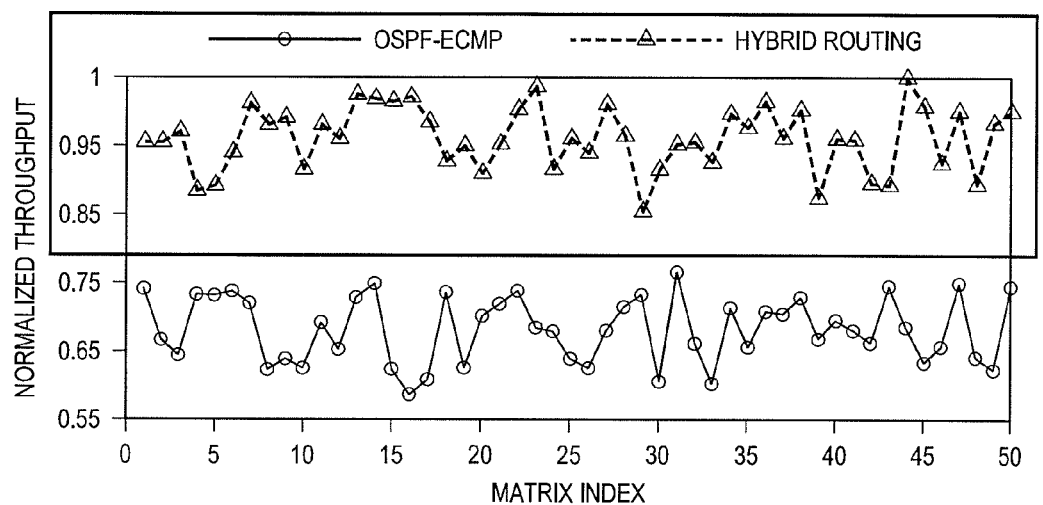
FIG. 8A and FIG. 8B illustrate results perform consistently well under other traffic scenarios.
Figure 8B:
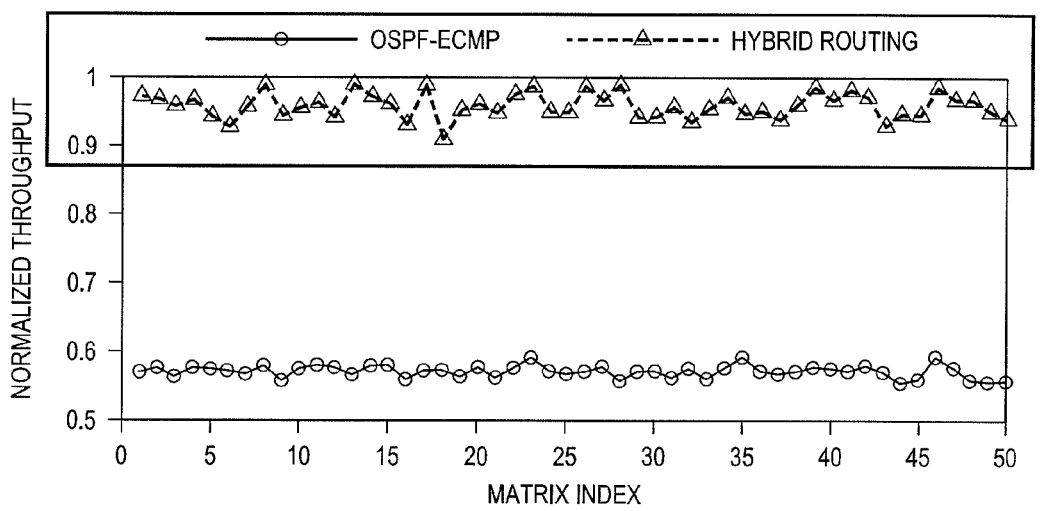

Hybrid routing uses a set of representative traffic matrices. Nevertheless, the results perform consistently well under other traffic scenarios as shown in FIG. 8A for Exodus and FIG. 8B for Sprintlink. Fifty (50) traffic matrices randomly generated show good performance in various networks.

Computation Complexity

The main complexity comes from the two linear programming. Preferably, CPLEX on a PC is used to solve the problems for the four practical networks, and the computation time is within 2 minutes as shown in the table below. For larger problems, more powerful computers can be used, such as www.neos-server.org, or develop heuristic algorithms.

| Topology | Computation time (in seconds) |
|---|---|
| Exodus 3967 | 29 |
| Abovenet 6461 | 32 |
| EBONE 1755 | 36 |
| Sprintlink 1239 | 78 |

Advantages of the Present Disclosure

The present disclosure provides the first unified framework to handle fluctuating traffic loads with hybrid routing. It significantly reduces the use of TCAM resources, thus reducing the cost and power consumption of routers. It greatly reduces the probability of congestion and achieves near-optimal load balancing. It is applicable to generic large-scale networks with different traffic scenarios, can be used in either static network planning, or dynamic routing, and has low computational and implementation complexity.

Figure 9:
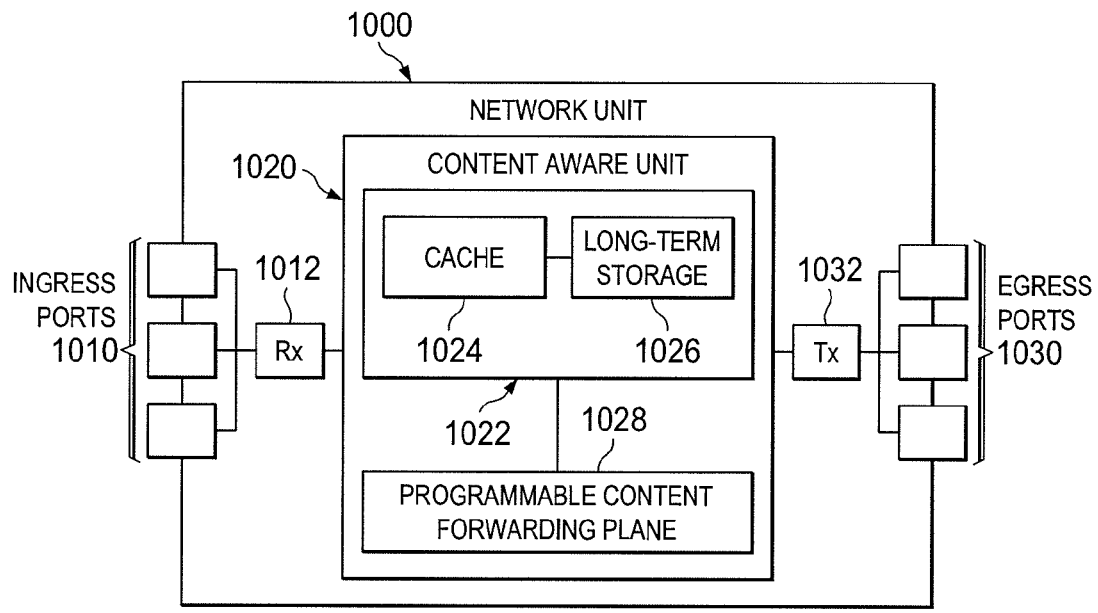
FIG. 9 illustrates an embodiment of a network unit.

FIG. 9 illustrates an embodiment of a network unit 1000, which may be any device that transports and processes data through network 100. For instance, the network unit 1000 may correspond to or may be located in any of the system nodes described above, such as a MN, AoS, content router R, and AS. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 9.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 10:
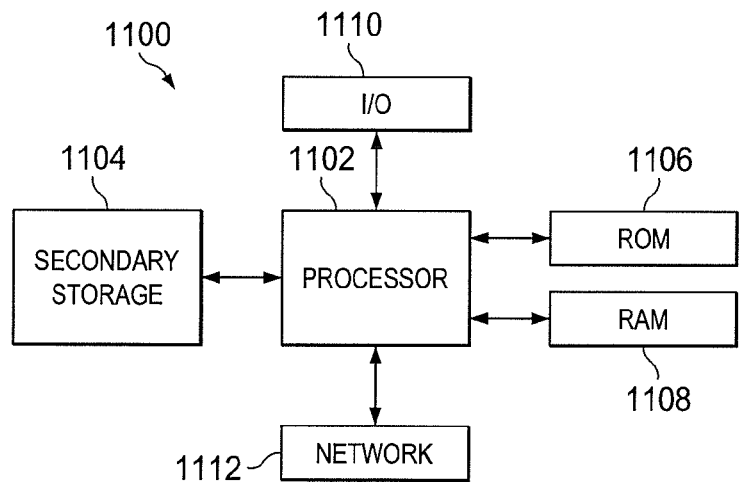
FIG. 10 illustrates a typical, general-purpose network component.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A controller in a software-defined networking (SDN) network having a data plane including a plurality of routers, the controller comprising:
   a non-transitory memory storage comprising instructions; and
   one or more processors in communication with the memory, wherein the one or more processors execute the instructions to:
      control the data plane to establish routing through the plurality of routers,
      establish hybrid routing comprising explicit routing and destination-based routing to balance a traffic load in the SDN network during a fluctuating load,
      perform a traffic categorization algorithm configured to identify a set of key flows, and
      explicitly route the set of key flows, wherein
   a number of entries in a ternary content-addressable memory (TCAM) for the hybrid routing is less than half of a number of entries required in the TCAM for optimal explicit routing only.

2. The controller as specified in claim 1, wherein the one or more processors further executes the instructions to utilize a set of representative traffic matrices representing fluctuating traffic load over time.

3. The controller as specified in claim 2, wherein the set of representative traffic matrices are based on historical traffic measurement data.

4. The controller as specified in claim 2, wherein the memory includes a destination-based multi-path routing algorithm executable by the one or more processors to improve load balancing of the traffic load based on the set of representative traffic matrices.

5. The controller as specified in claim 1, wherein the destination based routing is calculated based on linear programming.

6. The controller as specified in claim 1, wherein the one or more processors further execute the instructions to combine the destination-based routing and the explicit routing in a complementary way to establish the hybrid routing.

7. The controller as specified in claim 1, wherein the one or more processors are used in static network planning and dynamic routing.

8. A method of establishing routing in a software-defined networking (SDN) network having a data plane including a plurality of routers, comprising:
controlling, by a processor, the data plane to establish routing through the plurality of routers by
establishing hybrid routing comprising explicit routing and destination-based routing to balance a traffic load in the SDN network during a fluctuating load, wherein
the hybrid routing comprises a traffic categorization algorithm identifying a set of key flows,
the processor explicitly routes the set of key flows, and
a number of entries in a ternary content-addressable memory (TCAM) for the hybrid routing is less than half of a number of entries required in the TCAM for optimal explicit routing only.

9. The method as specified in claim 8, wherein controlling the data plane further comprises utilizing a set of representative traffic matrices representing fluctuating traffic load over time.

10. The method as specified in claim 9, wherein the set of representative traffic matrices are based on historical traffic measurement data.

11. The method as specified in claim 9, wherein the hybrid routing includes a destination-based multi-path routing algorithm improving load balancing of the traffic load based on the set of representative traffic matrices.

12. The method as specified in claim 8, wherein the destination based routing is calculated based on linear programming.

13. The method as specified in claim 8, wherein the processor combines the destination-based routing and the explicit routing in a complementary way to establish the hybrid routing.

14. The method as specified in claim 8, wherein the processor is used in static network planning and dynamic routing.

15. A non-transitory computer-readable medium storing computer instructions for establishing routing in a software-defined (SDN) network having a data plane including a plurality of routers that when executed by one or more processors, cause the one or more processors to perform the steps of:
controlling, by a processor, the data plane to establish routing through the plurality of routers by establishing hybrid routing comprising explicit routing and destination-based routing to balance a traffic load in the SDN network during a fluctuating load, wherein
the hybrid routing comprises a traffic categorization algorithm identifying a set of key flows,
the processor explicitly routes the set of key flows, and
a number of entries in a ternary content-addressable memory (TCAM) for the hybrid routing is less than half of a number of entries required in the TCAM for optimal explicit routing only.

16. The non-transitory computer-readable medium as specified in claim 15, wherein controlling the data plane further comprises utilizing a set of representative traffic matrices representing fluctuating traffic load over time.

17. The non-transitory computer-readable medium as specified in claim 16, wherein the set of representative traffic matrices are based on historical traffic measurement data.

18. The non-transitory computer-readable medium as specified in claim 16, wherein the hybrid routing includes a destination-based multi-path routing algorithm improving load balancing of the traffic load based on the set of representative traffic matrices.

19. The non-transitory computer-readable medium as specified in claim 15, wherein the destination based routing is calculated based on linear programming.

20. The non-transitory computer-readable medium as specified in claim 15, wherein the processor combines the destination-based routing and the explicit routing in a complementary way to establish the hybrid routing.

* * * * *